F. BATCHELOR.
Wheel-Harrow, Cultivator, and Seeding-Machine.
No. 228,021.                         Patented May 25, 1880.
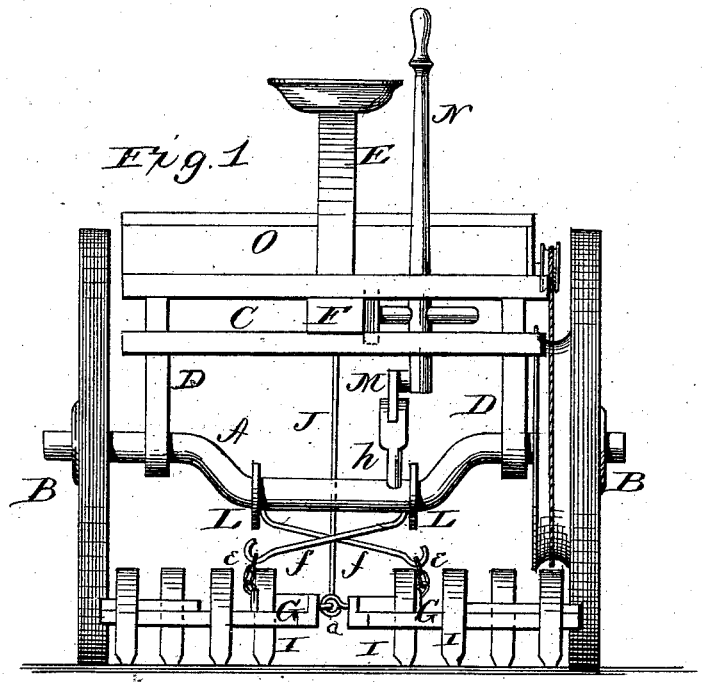
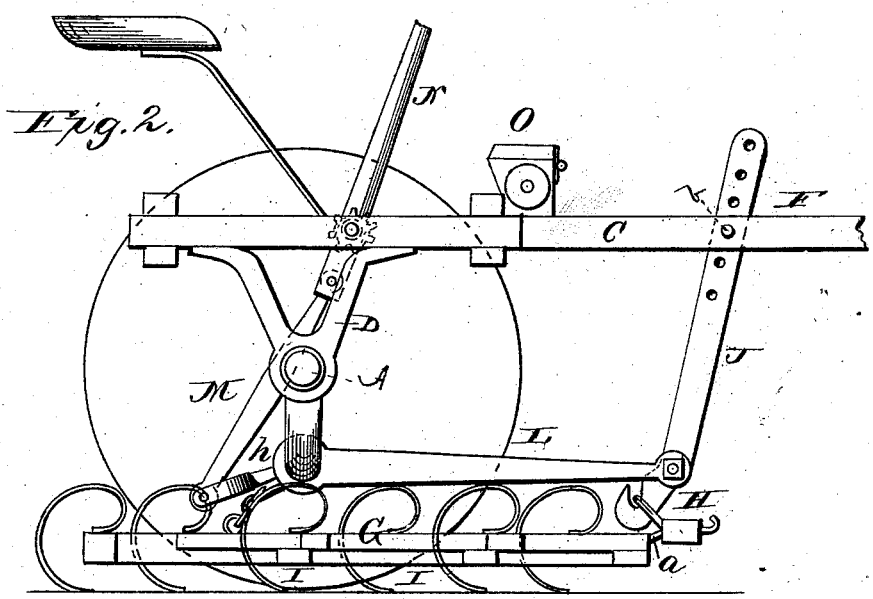

UNITED STATES PATENT OFFICE.

FRANK BATCHELOR, OF PLAINWELL, MICHIGAN.

WHEEL-HARROW, CULTIVATOR, AND SEEDING-MACHINE.

SPECIFICATION forming part of Letters Patent No. 228,021, dated May 25, 1880.

Application filed January 23, 1880.

*To all whom it may concern:*

Be it known that I, FRANK BATCHELOR, of Plainwell, in the county of Allegan, and in the State of Michigan, have invented certain new and useful Improvements in Wheel-Harrows, Cultivators, and Seeding-Machines; and I do hereby declare that the following is a full, clear, and exact description thereof, reference being had to the accompanying drawings, and to the letters of reference marked thereon, making a part of this specification.

The nature of my invention consists in the construction and arrangement of a sulky-harrow, cultivator, and seeder, as will be hereinafter more fully set forth.

In the annexed drawings, Figure 1 is a rear view of my machine. Fig. 2 is a side elevation of the same.

A represents the axle, formed with a long crank in the center and having upon each end a driving-wheel, B.

C is the sulky-frame, provided at each side with hangers or brackets D D, through which the ends of the axle A pass. E is the driver's seat, supported on the rear portion of the tongue F, which is firmly secured in the frame.

G G represent two harrow-frames, provided with spring-teeth I, curved substantially as shown, or in any other suitable manner. The front ends of the harrow-frames G G are connected by flexible couplings $a\, a$ to an evener, H, to which the team is to be hitched, so that the draft will be directly on the harrows, while the tongue or pole F is used simply as a guide.

The couplings $a\, a$ are made movable or adjustable in the evener, so that the distance between the front ends of the harrow-frames may be regulated according to the kind of work to be done.

To the evener H is connected a perforated arm, J, which extends upward and passes through a slot in the pole F, where it is adjusted up or down as required, and held by a pin, $b$, so as to regulate the distance of the harrow-frames from the ground.

To the lower portion of the arm J are pivoted two arms, L L, which extend rearward and pass around the axle, one at each end of the crank thereof, their rear ends being, by crossed rods $f\, f$ and links $e\, e$, flexibly connected to the rear ends of the harrow-frames.

The crank of the axle A is provided with an arm, $h$, which, by an arm, M, is connected with a lever, N, pivoted in the frame, by means of which the harrow may be raised up from the ground when desired.

A suitable pawl and ratchet are to be provided for holding the lever when the harrows are raised.

On the front of the frame C is a seed-box, O, with rotating seed-distributer, to be operated by a belt from a pulley on one of the driving-wheels B.

Having thus fully described my invention, what I claim as new, and desire to secure by Letters Patent, is—

The combination of the frame C, with hangers D, the axle A, harrow-frames G, with spring-teeth I and flexible couplings $a$, evener H, perforated arm J, pole F, arms L, rods and links $e\, f$, the lever N, and arms M $h$, all constructed and arranged substantially as and for the purposes herein set forth.

In testimony that I claim the foregoing I have hereunto set my hand this 29th day of September, 1879.

FRANK BATCHELOR.

Witnesses:
FOSTER M. METCALF,
ALBERT B. METCALF.